United States Patent
Tsengas

(10) Patent No.: US 7,789,045 B1
(45) Date of Patent: Sep. 7, 2010

(54) FLIPPING PET CHEW TOY

(75) Inventor: Steven Tsengas, Fairport Harbor, OH (US)

(73) Assignee: OurPet's Company, Fairport Harbor, OH (US)

( * ) Notice: Subject to any disclaimer, the term of this patent is extended or adjusted under 35 U.S.C. 154(b) by 0 days.

(21) Appl. No.: 12/403,800

(22) Filed: Mar. 13, 2009

Related U.S. Application Data

(60) Division of application No. 11/260,799, filed on Oct. 28, 2005, which is a continuation-in-part of application No. 10/755,160, filed on Jan. 12, 2004, now Pat. No. 7,032,541.

(51) Int. Cl.
*A01K 29/00* (2006.01)

(52) U.S. Cl. ...................................... 119/710

(58) Field of Classification Search ............... 119/702, 119/707–711
See application file for complete search history.

(56) References Cited

U.S. PATENT DOCUMENTS

| | | | |
|---|---|---|---|
| 5,553,570 A | 9/1996 | VanNatter, III et al. | |
| 5,595,142 A * | 1/1997 | Chill | 119/710 |
| 5,647,302 A * | 7/1997 | Shipp | 119/709 |
| 5,857,431 A * | 1/1999 | Peterson | 119/710 |
| 5,947,061 A | 9/1999 | Markham et al. | |
| 5,965,182 A | 10/1999 | Lindgren | |
| 6,112,703 A * | 9/2000 | Handelsman | 119/707 |
| 6,148,771 A * | 11/2000 | Costello | 119/709 |
| 6,158,391 A | 12/2000 | Simonetti | |
| 6,405,681 B1 * | 6/2002 | Ward | 119/707 |
| 6,427,634 B1 | 8/2002 | Mann | |
| 6,484,671 B2 | 11/2002 | Herrenbruck | |
| 6,557,496 B2 | 5/2003 | Herrenbruck | |
| 7,032,541 B1 * | 4/2006 | Tsengas | 119/710 |
| 7,234,420 B1 * | 6/2007 | Tsengas | 119/710 |
| 2003/0096554 A1 | 5/2003 | Persall | |
| 2003/0205206 A1 | 11/2003 | Natale et al. | |

* cited by examiner

*Primary Examiner*—Thomas Price
(74) *Attorney, Agent, or Firm*—John D. Gugliotta, PE. Esq.

(57) ABSTRACT

A flipping pet toy is provided having a first bore and a second bore parallelly disposed to the first bore. A series of ribs interstitial spaces there between are concentrically disposed about a central axis of the bores. A thin and laterally elongated body member forms a resilient, thin walled body circumscribing the bores such that said thin wall is capable of generating a resilient, springing action.

20 Claims, 3 Drawing Sheets

FLIPPING PET CHEW TOY

RELATED APPLICATIONS

There present invention is a Divisional Application of U.S. Ser. No. 11/260,799, Oct. 28, 2005 which was a Continuation in Part of U.S. Ser. No. 10/755,160, filed on Jan. 12, 2004 and now U.S. Pat. No. 7,032,541. The following other applications are also related: U.S. Pat. No. 7,234,420; and U.S. Ser. No. 11/256,693. All of the above related applications are incorporated by references as if fully rewritten herein.

BACKGROUND OF THE INVENTION

1. Field of the Invention

The present invention relates generally to a pet toy and, more particularly, to a pet toy that provides a "flipping" or "jumping" motion when interacted with by a pet.

2. Description of the Related Art

There are many pet toys available that provide entertainment to the pet and the owner, including pet toys that dispense treats upon rolling or movement of the toy. However, these toys provide for the insertion of the treats into cavities within the toy and for dispensing based on movement or rotation of the toy. The present invention is markedly different by providing external ribs and spaces between the ribs for impinging the treats so that the pet may physically extract the treats. This provides exercise to the muscles, strengthens teeth and gums, and extracts harmful plaque from the teeth of a pet. These, among other disclosed advantages and features, overcome many of the deficiencies outlined and inherent within the known prior art.

A search of the prior art did not disclose any patents that read directly on the claims of the instant invention; however, the following references were considered related:

U.S. Pat. Nos. 6,557,496 and 6,484,671, each issued in the name of Herrenbruck, disclose a treat dispensing toy having an exit allowing treats to be dispensed;

U.S. Pat. No. 6,427,634, issued in the name of Mann, discloses a pet toy having a trapper cavity for insertion of an animal attractant;

U.S. Pat. No. 6,158,391, issued in the name of Simonetti, discloses a treat dispensing toy having a pair of spaced disk portions and structured to enable treats to be dispensed from an interior chamber when an animal causes rotation of the toy;

U.S. Pat. No. 5,956,182, issued in the name of Lindgren, discloses an animal chew and play toy and a treat container;

U.S. Pat. No. 5,947,061, issued in the name of Markham et al., discloses a pet toy product with integral treats receiving receptacles for removably holding one or more animal treats;

U.S. Pat. No. 5,553,570, issued in the name of Van Natter, III et al., discloses a disc-shaped animal retrieval toy having a treat container;

U.S. Patent Application Publication 2003/0096554 A1, in the name of Persall, discloses a multipurpose disc toy useful as a water and food dish for a pet; and U.S. Patent Application Publication 2003/0205206 A1, in the name of Natale et al., discloses a dog bone holder.

Consequently, there exists a continuous need for new ideas and enhancements for existing products in the pet toy industry.

SUMMARY OF THE INVENTION

It is therefore an object of the present invention to provide a pet chew toy for holding consumable treats comprising a body member with a plurality of ribs and a plurality of interstitial spaces therebetween, a consumable treat "T" inserted between adjacent ribs and into the space.

It is a feature of the present invention to provide a pet toy comprising a bore concentrically disposed to the ribs and spaces.

It is another feature of the present invention to provide a pet toy comprising ribs and spaces helically disposed about the bore.

It is another feature of the present invention to provide a pet toy comprising ribs and spaces directionally disposed parallel to the bore.

It is another feature of the present invention that, if formed with a sufficiently narrow sidewall, will provide a resilient springing action to cause "flipping" or "jumping" when interacted with by a pet.

It is another feature of the present invention to provide a pet toy comprising a plurality of apertures formed in the body member for dispensing a flavored liquid, solid or semi-solid material and/or a scented aroma.

Briefly described according to one embodiment of the present invention, a pet chew toy for holding consumable treats comprises a body member having a plurality or ribs and a plurality of interstitial spaces formed between the ribs. The ribs and spaces cooperatively act to impinge a treat or treats inserted therein. The ribs and spaces may be disposed substantially parallel to the direction of the bore and a central axis, or may be disposed helically about the bore. The bore may be enclosed at one or both ends by threaded caps, heat bonded caps, or a combination thereof. A sound module may be provided within the bore for emitting a prerecorded or mechanically generated sound upon activation of the sound module. Alternately, if the toy is formed into narrow enough 'slices', a resilient, springing sidewall is formed that can result in a flipping or jumping motion when interacted with by a pet.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
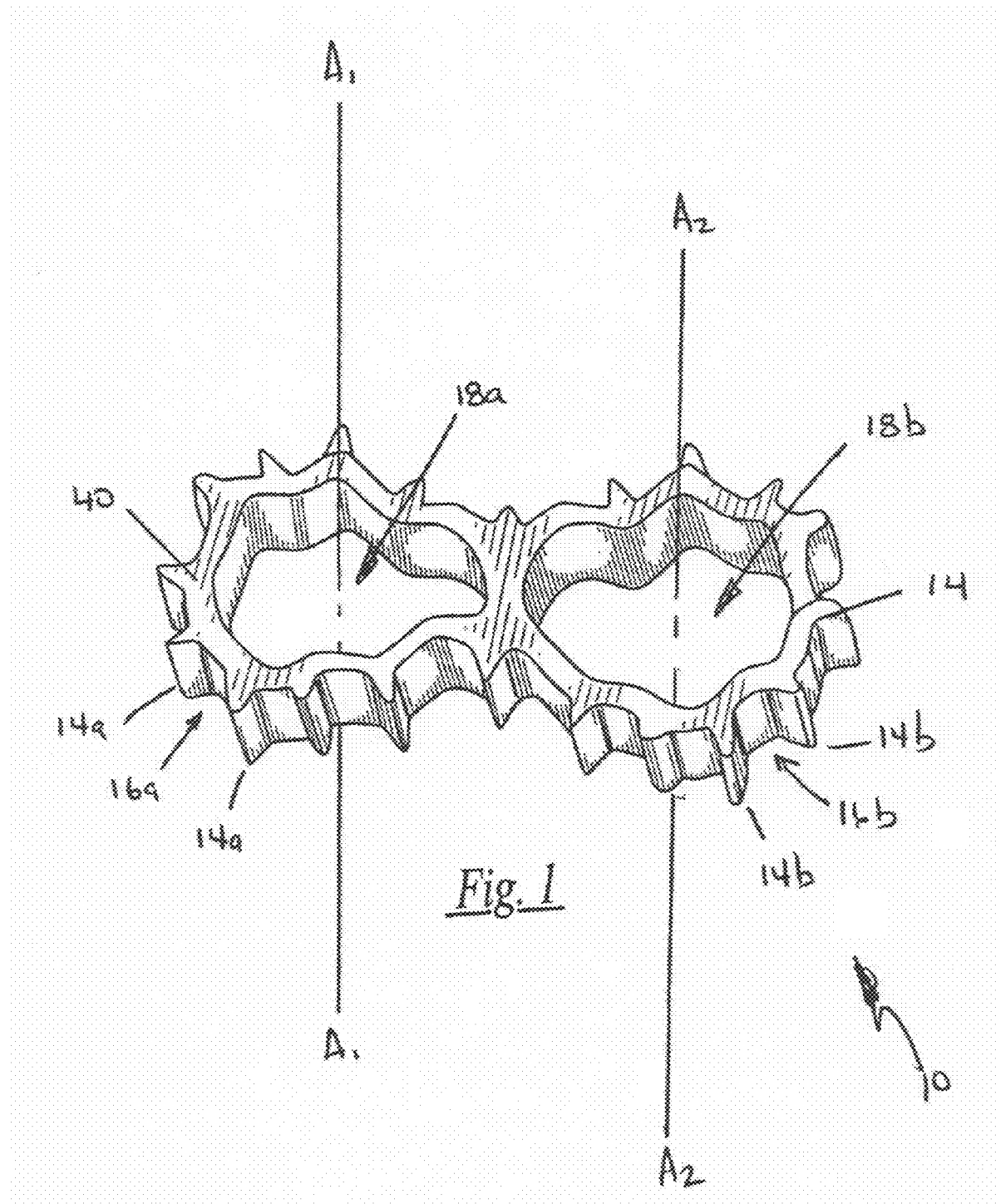
FIG. 1 is perspective view of a flipping pet chew toy according to the preferred embodiment of the present invention.
Figure 2:
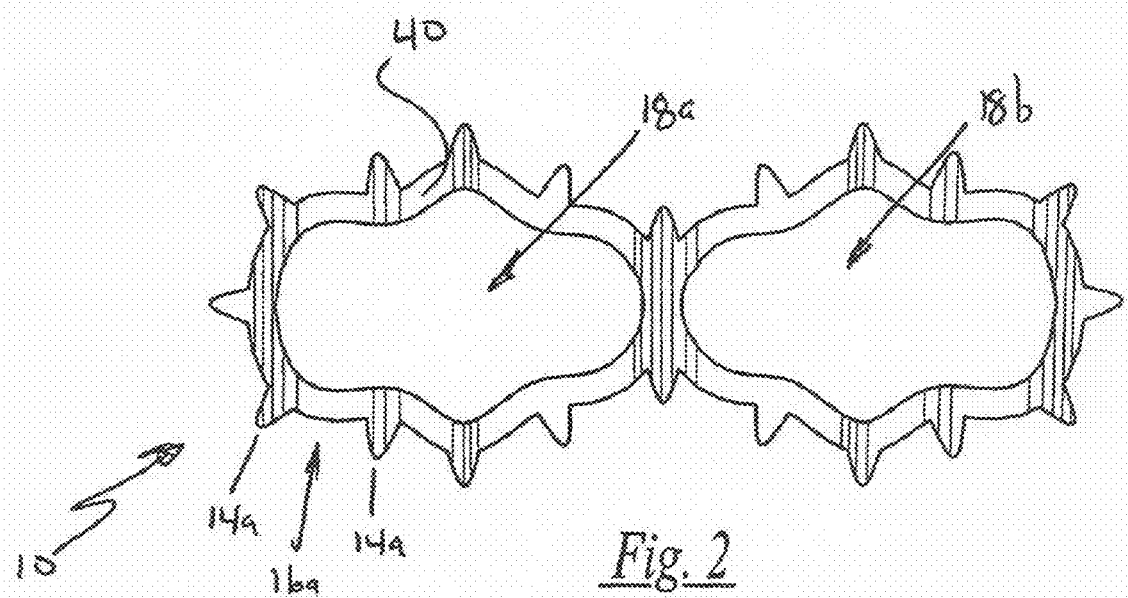
FIG. 2 is front elevational view thereof, the rear elevational view being a mirror image.
Figure 3:
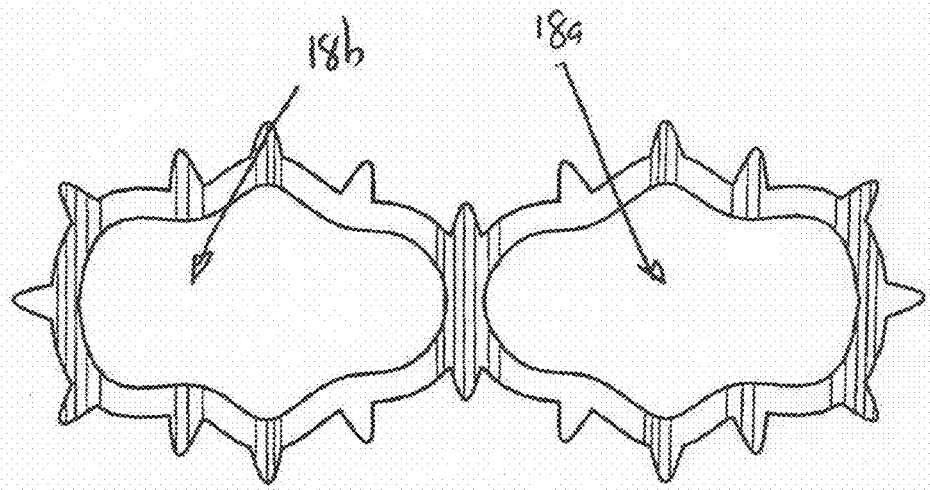
FIG. 3 is a top plan view thereof, the bottom plan view being a mirror image.
Figure 4:
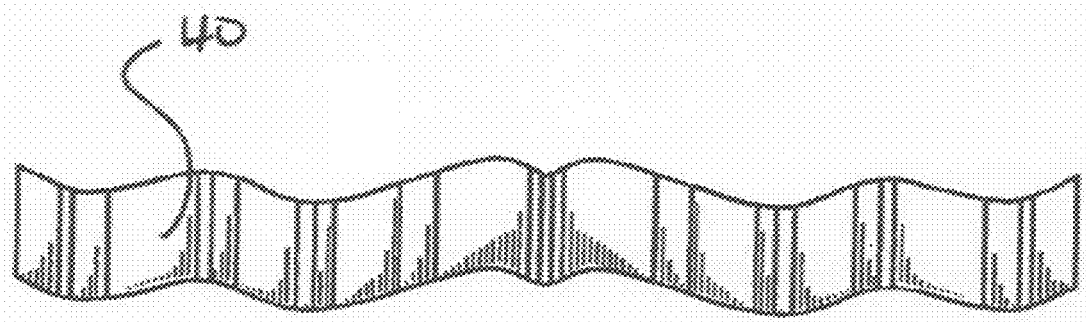
FIG. 4 is a side plan view thereof, the opposite site view being a mirror image.

The best mode for carrying out the invention is presented in terms of its preferred embodiment, herein depicted within FIGS. 1 through 4.

1. Detailed Description of the Figures

Figure 5:
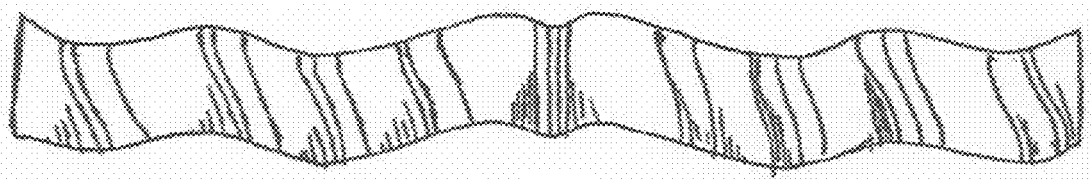
FIG. 5 is a side plan view thereof, wherein the embodiment includes ribs disposed helically about the bores.

Referring now to FIGS. 1-5, a flipping pet toy according to the preferred embodiment of the present invention is shown in which the toy 12 comprises a first bore 18a and a second bore 18b parallelly disposed to the first bore 18a. The plurality of ribs 14 comprise a first series of ribs 14a and a first series of interstitial spaces 16a there between concentrically disposed about a central axis "A1" of the first bore 18a, and a second series of ribs 14b and a second series of interstitial spaces 16b there between concentrically disposed about a central axis "A2" of the second bore 18b.

In greater detail, a first series of ribs 14a and a first series of interstitial spaces 16a there between disposed about a central axis "A1" of the first bore 18a, and a second series of ribs 14b and a second series of interstitial spaces 16b there between disposed about a central axis "A2" of the second bore. The toy 12 is preferably manufactured via an extrusion molding process from an elastomeric product (such as thermoset or thermoplastic high tear strength material). The configuration of the present invention includes a number of protrusions (generally symmetrical to a central axis) which are likely to adhere or stick to a mold in another molding process, such as injection molding. The adhesion of the material to the mold results in increased costs and inefficient production, thus extrusion molding of the present invention is superior to other types of molding processes from a cost saving and efficiency concerned point of view.

2. Operation of the Preferred Embodiment

It has been found that when the toy 10 is cut or manufactured with a very narrow sidewall 40, it can be an effective play device for a pet, especially felines. The toy 10 when chased or batted generates a "flipping" and randomly bouncing motion that stimulates a feline to chase and further interact. By providing this stimulation, the pet must exert energy, exercise jaw and head muscles, using the teeth and gums, thus the exercise muscles of the head and neck, and strengthens teeth and gums, and removes harmful plaque from the teeth and gumlines.

The toy 10 is envisioned as being adaptable for manufacture directed to variously sized animals, including the various breeds of canines. Thus, the toy 10 may be manufactured in sizes for small breeds, medium size breeds and large breeds, respectively. It is envisioned that the diameters may vary in a range from one inch to four inches, and that the lengths may vary in range from two inches to approximately twelve inches.

It is envisioned that other styles and configurations of the present invention can be easily incorporated into the teachings of the present invention, and only one particular configuration shall be shown and described for purposes of clarity and disclosure and not by way of limitation of scope.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:
1. A pet chew toy comprising:
    a thin and laterally elongated body member and forming a resilient, thin walled body circumscribing at least one orifice such that said thin wall is capable of generating a resilient, springing action;
    a liquid flavoring impregnating said body member and dispenses through a plurality of apertures formed in said body member; and
    a plurality of ribs extending outward from said thin wall.
2. The pet chew toy of claim 1, further comprising impregnating said body member with an aroma.
3. The pet chew toy of claim 1, wherein said toy is formed by extrusion molding.
4. The pet chew toy of claim 3, wherein said toy is formed from thermoplastic.
5. The pet chew toy of claim 1, further comprising:
    said thin and laterally elongated body member forming a resilient, thin walled body circumscribing at least a second orifice such that said thin wall is capable of generating a resilient, springing action.
6. The pet chew toy of claim 5, further comprising:
    a plurality of ribs extending outward from said thin wall.
7. The pet chew toy of claim 6, further comprising:
    a plurality of interstitial recesses between said ribs extending inward to from said thin wall.
8. The pet chew toy of claim 1, further comprising:
    a plurality of interstitial recesses between said ribs extending, inward to said thin wall.
9. The pet chew toy of claim 8, further comprising:
    a plurality of interstitial recesses between said ribs extending inward to from said thin wall.
10. A flipping pet chew toy comprising:
    a first annular sidewall circumscribing a first orifice, said first sidewall forming a resilient thin walled body circumscribing such that said thin wall is capable of generating a resilient, springing action; and
    a second annular sidewall circumscribing a second orifice, said second sidewall forming a resilient thin walled body circumscribing such that said thin wall is capable of generating a resilient, springing action;
    wherein said first annular sidewall is connected to said second annular sidewall.
11. The flipping pct chew toy of claim 10, wherein a liquid flavoring impregnating said body member and dispenses through a plurality of apertures fobrmed in said body member.
12. The flipping pet chew toy of claim 10, wherein said first annular sidewall is connected to said second annular sidewall in a generally symmetric fashion about a centerpoint.
13. The flipping pet chew toy of claim 10, further comprising:
    a plurality of ribs extending outward from said thin wall.
14. The flipping pet chew toy of claim 10, further comprising:
    a plurality of interstitial recesses between said ribs extending inward to from said thin wall.
15. The flipping pet chew toy of claim 10, wherein said first annular sidewall is connected to said second, annular sidewall such that said resilient sidewalls can be conformed to a generally symmetric shape about a centerpoint.
16. A pet chew toy comprising:
    a thin walled laterally elongated body member forming a resilient body circumscribing at least a one orifice such that said resiliency of said thin wall is capable of generating a springing action; and a plurality of shaped features formed an outer surface of said thin wall such that said features are capable of creating a flipping-like motion to said springing action when directed against a surface wherein said plurality of shaped features comprises a plurality of ribs extending outward from said thin wall.

17. The pet chew toy of claim 16, wherein said toy is capable of being formed by extrusion molding.

18. The pet chew toy of claim 17, wherein said toy is formed from thermoplastic.

19. The pet chew toy of claim 16, further comprising a plurality of interstitial recesses between paid ribs extending inward to said thin wall.

20. The pet chew toy of claim 19, wherein said plurality of shaped features further comprises a plurality of interstitial recesses between said ribs extending inward to from said thin wall.

* * * * *